Sept. 2, 1958 C. C. CUTLER 2,850,677

SIGNAL STORAGE APPARATUS

Filed March 29, 1956 3 Sheets-Sheet 1

INVENTOR
C. C. CUTLER
BY
Arthur J. Torsiglieri
ATTORNEY

INVENTOR
C. C. CUTLER
BY
Arthur J. Torsiglieri
ATTORNEY

INVENTOR
C. C. CUTLER
BY
Arthur J. Torsiglieri
ATTORNEY

United States Patent Office 2,850,677

Patented Sept. 2, 1958

2,850,677

SIGNAL STORAGE APPARATUS

Cassius C. Cutler, Gillette, N. J., assignor to Bell Telephone Laboratories, Incorporated, New York, N. Y., a corporation of New York Application March 29, 1956, Serial No. 574,672

15 Claims. (Cl. 315—12)

The present invention relates to electron discharge apparatus useful for storing electrical signals.

Apparatus for storing electrical signals has typically included an electron gun to serve as the source of an electron beam, a storage target electrode, and means for sweeping the electron beam across the surface of the target electrode in successive scans. The target generally comprises a conductive sheet with a coating of dielectric material on one of its surfaces. In operation, as the beam is swept across the dielectric surface of the target the signal voltage to be stored is applied to modulate either the beam itself or the potential of the target conductive sheet. Consequently each scanned elemental area of the dielectric storage surface acquires a voltage charge which corresponds to the level of the applied modulating signal at the time the elemental area is struck by the beam. Thus the applied signal voltage is effectively converted into a geometric pattern of stored charge on a plane surface which may subsequently be reconverted into a voltage signal by again appropriately scanning the storage surface with an electron beam.

In such apparatus the amount of voltage signal information that can be stored is limited by the size of the storage surface area. Such a limitation in the amount of information that can be stored is becoming increasingly more significant with the advent of transmission equipment capable of transmitting extremely broad band width voltage signals and correspondingly large amounts of information. Moreover, inherent difficulties exist in known apparatus having a large storage surface area. These difficulties pertain to the inability accurately to deposit a bit of information and subsequently readily to locate that exact stored information bit.

Accordingly, a principal object of the present invention is to increase the amount of signal information that may be stored conveniently in a single storage tube. A corollary object is to store information on a three dimensional target in such a manner that the information bits are conveniently deposited and subsequently readily located.

To these ends a feature of the present invention is a signal storage system including a storage tube which utilizes for signal storing a three dimensional storage target and associated circuitry. The target is characterized in that it comprises a matrix-like array of wire-like conductive elements of which selected elements of the array are coated with dielectric material for signal storage thereon and other elements of the array are employed as control electrodes for providing electron flow through the array in a prescribed pattern. There is further provided in accordance with the invention circuitry which is associated with the storage tube for making available for storage purposes the improved three dimensional storage surface thereof.

In an illustrative embodiment of the invention, the storage tube includes an evacuated envelope which includes at one end an electron source and at the other end a three dimensional storage target. The storage target comprises a matrix-like array of parallel wire-like elements, each extending transversely in target relation to the electron source. The elements are arranged in vertical columns and horizontal rows. Each element of one set of alternate vertical columns of the array is provided with a dielectric coating which adapts it for use as a storage electrode. Each element of the other set of alternate vertical columns is left uncoated and serves as a control electrode for use in determining the path of electron flow. In operation, an electron beam originating from the electron source is projected towards the target array and is swept in the usual scanning pattern across the face of the array under control of a deflection system. In a complete scan the beam enters in turn the successive interspaces between adjacent pairs of horizontal rows of elements for passing horizontally through the array. As the beam passes through the array between a pair of rows of elements, it is deflected vertically from its horizontal path to impinge upon selected storage electrodes under the influence of voltages applied to the control electrodes. Under the control of circuitry associated with the storage electron tube, sequential scans are used for reading and erasing signal charge patterns deposited on the storage electrodes.

In a second illustrative embodiment, a storage device includes a target comprising a matrix-like array of conductive wire-like elements, each of which is coated with dielectric material for signal storage. In this embodiment, as will be explained hereinafter in greater detail, selected elements of the array serve as storage electrodes when storage is to be had on their surfaces and as control electrodes for diverting the path of the electron beam when storage is to be had on the dielectric coating of adjacent elements then serving as storage electrodes.

The invention will be more clearly understood from the following description and the accompanying drawing, in which:

Fig. 1A is a longitudinal sectional view of a storage device of the kind which forms a feature of the present invention together with its associated circuitry which is shown schematically;

Figs. 1B, 1C, and 1D are enlarged longitudinal sectional views of a portion of the storage target of the device shown in Fig. 1A for illustrating the action of the electron beam during writing, reading, and erasing, respectively;

Figure 1A:
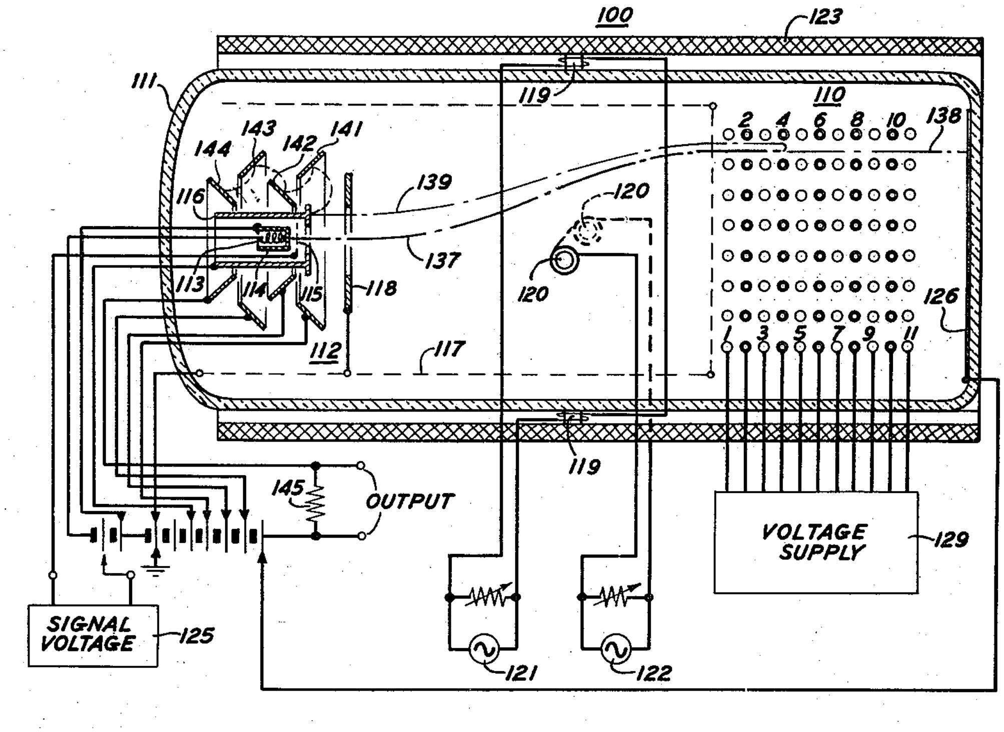

Referring more particularly to the drawing, Fig. 1A shows by way of example a storage tube 100 employing a three dimensional target 110 which comprises a matrix-like array of conductive wire-like elements. The elements extend parallel to each other in a direction perpendicular to the plane of the paper and are arranged in vertical columns and horizontal rows. The elements of alternate columns 1, 3, 5, 9, and 11 serve as control electrodes and those of the remaining columns 2, 4, 6, 8, and 10 serve as storage electrodes. The storage electrodes are coated with a surface layer of dielectric material for storage thereon of a voltage signal. The dielectric material extends continuously along the length of the electrodes but, alternatively, it may be deposited only over discrete surface areas along the electrodes to form along each electrode a succession of dielectric islands, of the kind disclosed in U. S. Patent 2,726,328, issued December 6, 1955, of A. M. Clogston. The tube 100 further comprises an evacuated envelope 111 enclosing the target 110 and an electron gun 112 shown schematically as including heater 113, cathode 114, control grid 115, and accelerating anode 116 for generating a beam of electrons and accelerating the beam toward the target. The beam is advantageously of circular cross section with a diameter less than the spacing between adjacent rows of elements of the target. Other electrodes may be employed for beam forming, as desired. A nonmagnetic conductive mesh grid 117 is positioned along envelope 111 to preclude the accumulation of charge along the interior surface of the envelope, which is typically of glass, and so to avoid the adverse effect such an accumulated charge would have on the electron beam. Additionally, the right-hand end of the mesh grid extends across the envelope adjacent target 110 for intercepting the electron beam except when it is aligned to pass along the interspaces between the element rows of the target. An annular electrode 118 is positioned adjacent electron gun 112 and is maintained at the same electrical potential as mesh grid 117, which may conveniently be ground or reference potential, for reducing the speed of the electron beam emitted from the gun. Such a low potential or slow velocity beam is desired in the region of target 110 since it may more readily be deflected for striking a predetermined portion of the target storage area. Intermediate anode 118 and target 110, and preferably outside envelope 111, in space quadrature are two sets of electromagnetic deflecting coils 119 and 120 which are energized by voltage sources 121 and 122, respectively, as is known in the art, for sweeping the electron beam across the face of the target. These coils advantageously further act, in concert with solenoid 123 surrounding envelope 111, to collimate the beam for passage parallel to the tube axis along the interspaces between adjacent element rows of the target.

In operation, appropriate voltages are applied to the various electrodes of gun 112 for generating a low velocity beam, for example: cathode 114 is maintained at 10 volts negative, control grid 115 at 12 volts negative, and accelerating anode 116 at 100 volts positive. An electron beam emitted from gun 112 is modulated in accordance with a signal voltage from source 125 applied to control grid 115 and the modulated beam is deflected by coils 119 and 120 to scan the face of the target 110. If each of the control and storage elements of the target is at the beam potential, which is approximately equal to the difference between cathode 114 and second anode electrode 118, the beam will pass undisturbed through the interspaces between the element rows to strike collector 126. When, however, a suitable voltage is applied to selected elements of the target, the beam may be diverted from its path to strike predetermined storage elements for storage thereon.

Figure 1B:
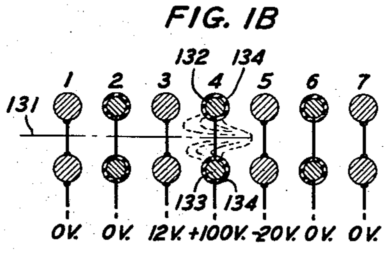

It is generally preferable from the standpoint of improved signal-to-noise ratio to store any signal in a binary code form, for example by a succession of "ones" and "zeros." If the signal information which it is desired to store is multivalued, it is advantageous to code the signal in a binary code form. This technique is now familiar to workers in the art and is described as pulse code modulation. It will be convenient to discuss the invention specifically with respect to such operation, although multivalued storage is possible. In the storage system of Fig. 1, the electron beam is pulsed on for "ones" and pulsed off for "zeros" by means of signal pulses from source 125 applied to the control grid of the electron gun. For purposes of illustration, let us assume that a "one" is to be stored selectively on two storage elements of column 4. Two such elements 132, 133 are shown in Fig. 1B, which is an enlarged view of a portion of target 110 of Fig. 1A. The storage is actually to take place on adjacent surfaces 134 of the two elements. To this end the associated circuitry of Fig. 1A is operated to provide appropriate potentials on the elements adjacent column 4. In particular, the electrical potential of the wire core of the storage elements of column 4 is increased to approximately 100 volts, the potential of the wire control electrodes of column 5 is decreased to approximately 20 volts negative, and the potential of the wire control electrodes of column 3 is decreased slightly to approximately 12 volts negative while the remaining columns of wires are maintained at ground potential. The control wires of each column are electrically interconnected, as are the wire cores of the storage elements of each column, for conveniently changing the potential of each element in the column simultaneously. Electrons in a beam passing along path 131 between the two rows of Fig. 1B are reflected by the negative field in the region of control column 5 and are attracted to the storage surface 134 of the storage elements in column 4. Any electrons which tend to travel back past column 4 are again reflected (back towards column 4) by the small negative field in the region of column 3. It will be appreciated that the small negative potential on column 3 must be insufficient to disturb the beam on its initial passage along path 131.

As a result of the impingement of the electrons of the beam on the column 4 storage elements, surface 134 of these elements takes on a charge corresponding to the number of electrons impinging. As the electron beam is swept horizontally past the storage target, that is, in a direction perpendicular to the plane of the paper, there is deposited along the surfaces of elements 132 and 133 a charge pattern corresponding to an applied series of ones and zeros. By appropriate choice of the dielectric coating, this charge pattern can be made quite stable for a relatively long period of time.

After the signal has been stored along the surfaces of one pair of storage elements, it is feasible to continue the storage process on either the succeeding pair of storage elements in the same vertical column or the adjacent pair of storage elements of the succeeding vertical column. Moreover, in some instances it will be desirable to sweep the electron beam vertically, that is, in the plane of the paper, rather than horizontally as has been described. The choice of the sweeping pattern is largely determined by the nature of the particular application for which the tube is to be used. As the beam is swept in the selected pattern across the storage target, voltage charges are deposited on the surface areas of the various storage elements as the respective elements are maintained at appropriate potentials for storing. It is important, however, that the stored charge is of insufficient magnitude to interfere with the passage of the beam during storage. Otherwise storage on the elements at the end of the target more remote from the electron gun would be inhibited. For the operating conditions described, the magnitude of stored charge advantageously should not exceed 5 volts.

Figure 1C:
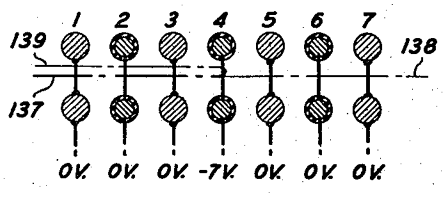
Figure 1D:
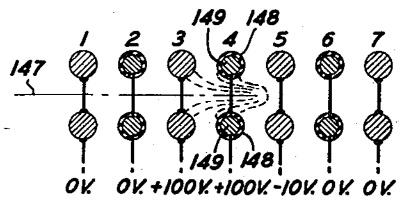

For reading, the potential of the wire cores of the storage elements to be read is decreased until the surface potential of these storage elements is low enough to restrict the passage of the beam. Such restriction of the passage of the electron beam, as indicated by broken line 139 in Figs. 1A and 1C, is analogous to the operation of a control grid in a conventional triode. As shown in these figures the beam will pass along a path 137 from left to right until reaching the region of the storage elements to be read, for example those of column 4. The amount of beam current which passes column 4 along path 138, and thus the level of the current reaching collector 126, will correspond to the stored charge. Additionally, the beam current reflected along path 139 will likewise correspond to the stored charge and hence may also be utilized to provide an output signal. In the tube of Fig. 1A the electrons reflected along path 139 are deflected by coils 119 and 120 to strike the right-hand surface of anode 116 whereupon secondary electrons are released and attracted in turn to each of plates 141, 142, 143, and 144, which form a conventional electron multiplier. Load resistor 145 is connected to plate 144 across which is developed an output voltage which is a replica of the reflected current and consequently the stored charge.

Before again writing on a charged surface, the charge on that surface must be erased. Column 4 will again be used to illustrate the technique of erasure. The erasure of this column is accomplished by increasing the potential of the conductive wire cores of the storage elements of column 4 and of the control wires of preceding column 3 to approximately 100 volts and decreasing the potential of the control wires of following column 5 to approximately 10 volts negative. The beam 147 will then be deflected to impinge on the elements of columns 3 and 4 causing the surface 148 of the column 4 storage elements to charge to the same potential as the control wires of column 3 and consequently to the same potential as the wire cores of the storage elements in column 4. Thus the storage surface 148 will be at the same potential as wire cores 149 whereupon writing may again commence.

Alternatively, erasure of the stored charge from the storage elements can be accomplished by heating each storage element, for example by passing a current through its wire core, until its dielectric surface becomes slightly conductive whereupon the stored charge will leak off. This admittedly is time consuming and hence is limited in application. A further technique is to strike simultaneously all of the storage elements of the target with a flooding electron beam so that the surface of each storage element reaches an equilibrium potential established by the adjacent control wire. One way of obtaining such a flooding beam is merely to reduce the strength of the focusing field during erasure, for example by decreasing the current flow through solenoid 123, so that electrons are no longer focused in a fine beam but spread out to strike all the storage elements.

Figure 2:
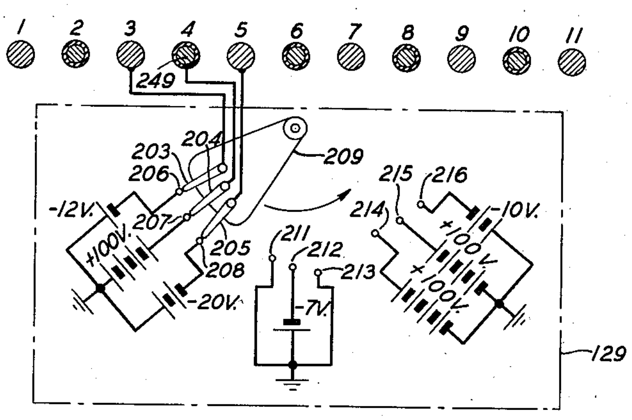
Fig. 2 is a simplified schematic showing the nature of the voltage supply shown in block form in Fig. 1A.

A simplified schematic diagram of a portion of the voltage supply 129 is shown in Fig. 2. To avoid confusion, only that portion of the voltage supply required for writing, reading, and erasing the storage elements of column 4 has been shown. Similar portions of the voltage supply will of course be provided in practice for use with the other columns of storage elements. Additionally, it is understood that each of the columns except the one in use and that immediately preceding and immediately following is maintained at ground potential. In the interest of simplicity, a mechanical switch is illustrated but ordinarily electronic switches of the type known to workers in the art would be employed for control of the circuitry used to establish the desired operating voltages on the various elements. The control wires of columns 3 and 5 and wire core 249 are connected to contact arms 203, 204, and 205, respectively, which are in turn connected to contacts 206, 207, and 208 for writing, whereby the respective columns are maintained at the potentials previously set forth. For reading, the switching element 209 is rotated counterclockwise to a second position whereby contact arms 203, 204 and 205 connect with contacts 211, 212, and 213. Column 4 is thus reduced to a suitable voltage for restricting the flow of beam current therepast in accordance with the stored charge. Finally, for erasing, switching element 209 is rotated counterclockwise to a third position whereby arms 203, 204, and 205 connect with contacts 214, 215, and 216, and in turn to voltages suitable for erasing.

Figure 3:
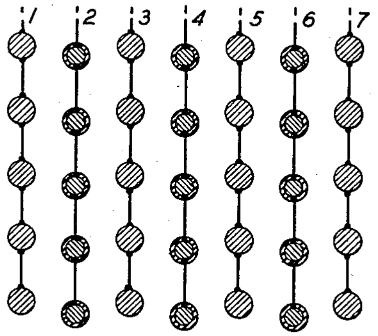
Figs. 3 and 5 show longitudinal sections of modified versions of the storage target included in the storage device shown in Fig. 1A.

A modification of the storage target of Fig. 1A is shown in Fig. 3. In this modification the position of alternate columns of elements is staggered so that the centers of the wires in each row no longer lie along a straight line. The operation of a storage tube employing this target is substantially the same as that previously discussed. However, an advantage is obtained in writing. This can be understood by referring back to Fig. 1B. In that figure after beam 131 is reflected at the region of column 5, it encounters a field which is symmetric about the initial beam path 131. Hence, electrons near the center of the beam will tend to be reflected back along path 131 and will not impinge on storage surface 134. The target of Fig. 3 avoids this by virtue of its staggered configuration which provides a transverse field component across the entire electron beam, thereby precluding even the electrons at the center of the beam from passing back to the electron gun.

Figure 4:
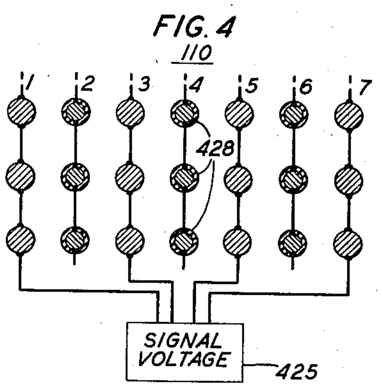
Fig. 4 is an enlarged view of a portion of the storage target included in the device of Fig. 1A, shown with provision for applying to the target elements the signal voltage to be stored rather than applying such signal voltage to modulate the beam.

Fig. 4 shows a portion of the storage target 110 of Fig. 1A with a signal voltage source 425 for applying the signal voltage to be stored to the columns of control wires of target 110. This operation is to be distinguished from that of the foregoing figures where the signal to be stored was applied to modulate the beam. By the technique of applying the voltage directly to the columns, the steps of erasing stored information and of writing additional information are combined into a single step. Consider the process of erasing the stored charge on column 4. As previously discussed, by increasing the potential of the wires of columns 3 and 4 to 100 volts and decreasing the potential of the wires of column 5 to 10 volts negative, the storage surface 428 of the elements of column 4 will charge to the potential of the wires of column 3. However, if a signal voltage be applied to the wires of column 3 in addition to the 100 volts D.-C., storage surface 428 will charge to the level of that signal voltage. Moreover, if the level of the signal voltage applied to column 3 is varied as the beam scans the storage surface, that surface will acquire a charge whose geometric pattern corresponds to the variations in the applied signal, while the previously stored charge is effectively erased. Reading of the charge thus stored is substantially the same as explained with reference to the tube of Fig. 1A.

Figure 5:
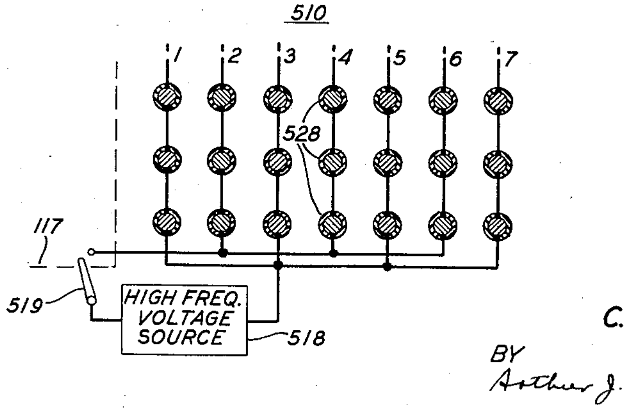

A further modification of the storage target of Fig. 1A is shown in Fig. 5. In this latter figure, each of the conductive wires of the storage target 510 is coated with a dielectric material so that signal voltage may be stored on each one. This serves to double the effective storage area. However, certain factors present in this modification disadvantageously require additional equipment for satisfactory tube performance. Storing and reading with storage target 510 is substantially the same as previously described with reference to the storage target of Fig. 1A. However, such is not the case for erasing. In particular, for storing on the elements of column 4 the wires of columns 3 and 5 serve as control wires for deflecting the beam in the manner previously discussed, while for storing on the elements of column 5 the wires of columns 4 and 6 serve as control wires. Hence the various elements serve as storage elements when storage is to be had on their surfaces and as control elements when storage is to be had on the surfaces of adjacent elements. Difficulties arise during erasing because there are no conductive surfaces adjacent the storage surface being erased. If, for example, erasure of the voltage stored on surfaces 528 of column 4 is desired, the electron beam will be deflected to strike the surface of the elements in that column, in the manner previously discussed, whereupon secondary electrons are emitted. These secondaries will be attracted to mesh grid 17, which is the nearest conductive surface, until the potential of surface 528 approximately equals that of the mesh grid, whereupon erasure is effected. Where a large number of columns of elements is used and consequently some columns are quite remote from mesh grid 117, it is desirable during erasure to assist the passage of secondary electrons to the mesh grid. To this end, high frequency voltage supply 518 applies between adjacent columns an alternating voltage, the frequency of the voltage preferably being sufficiently high that the transit time of the secondary electrons moving from one column to the next corresponds approximately to a half cycle of the voltage. In such a case, when secondary electrons leave surface 528, during one half of each cycle the alternating voltage from source 518 will cause column 3 to be at a higher potential than column 4, thus attracting the secondaries to column 3. As these secondary electrons reach column 3, however, the voltage from source 518 will have changed a half cycle and the potential of column 2 is then higher than that of column 3. This action continues as the electrons are attracted from column to column and finally reach mesh grid 117. If the level of the voltage supplied from source 518 is sufficiently high to cause a secondary emission ratio greater than unity from the storage surfaces, while the frequency of the voltage is maintained high as described, an electron beam will not be required for initiating the secondary emission and hence no beam need be used during erasure. Such operation utilizes the principles of what is known as the "multipactor effect." Switch 519 serves to connect source 518 to target 510 and hence is maintained open except during erasure. An alternative and perhaps superior technique for achieving the multipactor effect is to apply the high frequency voltage across the entire array, that is, between the wire cores of the first and last columns, rather than between each pair of adjacent columns.

Figure 6:
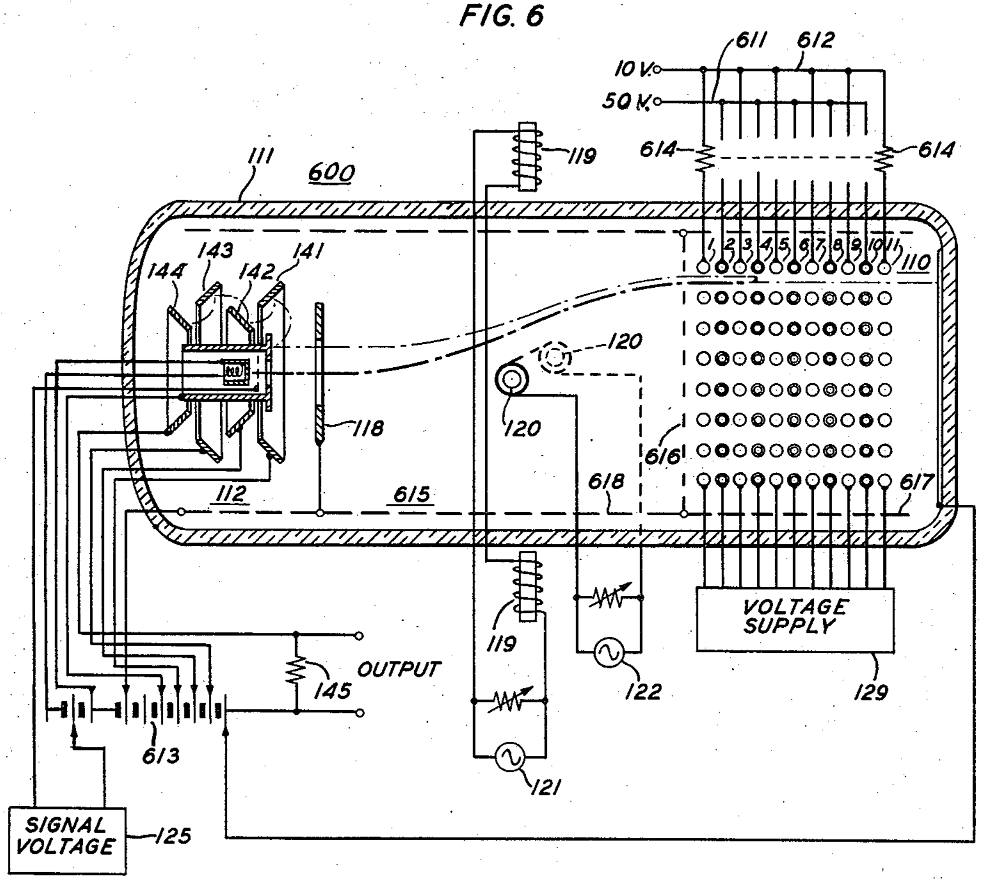
Fig. 6 is a longitudinal section of a modified form of the storage device of Fig. 1 utilizing an alternative beam focusing arrangement.

Fig. 6 shows, as a further example of an embodiment of the present invention, a storage tube 600 of the type shown in Fig. 1A. Elements of this tube previously described with reference to Fig. 1A have been given like reference numerals and will not be redescribed. In this tube an alternative technique for focusing the electron beam is employed. A beam emitted from electron gun 112 will be decelerated by the second anode electrode 118 and then deflected by coils 119 and 120 to scan the spaces between adjacent element rows of target 110, as previously discussed. Unlike the tube of Fig. 1A, however, no solenoid is provided for collimating the beam for passage between the rows along a path parallel to the tube axis. Such collimation is achieved in the present tube by an electrostatic focusing field in the region of the target. The focusing field is obtained by maintaining adjacent columns of wires of the target at different potentials and alternate columns at the same potential to establish a spatially alternating longitudinal electrostatic field along the interspace between adjacent rows.

Such a spatially alternating field is established by the use of conductive leads 611 and 612 connected to voltage supply 613 at points of approximately 50 volts and 10 volts, respectively, for maintaining adjacent columns at different potentials. Resistors 614 are connected between these leads and the respective columns so that the voltage of particular columns may be changed by voltage supply 129 for writing, reading, and erasing as previously discussed. Additionally, mesh grid 615 of the present tube is somewhat different from that of Fig. 1A, since it is utilized in the present tube not only to prevent an accumulation of charge on the tube wall but also to shield magnetically target 110 from the magnetic flux of coils 119 and 120 which would otherwise interfere with the electrostatic focusing field in the target region. Hence the mesh grid comprises magnetic portions 616 and 617 for shielding target 110, as well as a nonmagnetic portion 618. The operations of writing, reading, and erasing in this tube are substantially the same as that of the tube of Fig. 1A.

It is understood that the embodiments described are merely illustrative of the principles of the present invention. Various modifications may be made by one skilled in the art without departing from the spirit and scope of the invention. For example, the three dimensional target may be modified so that the elements of each column lie along an arcuate path, that is, a continuous line joining the elements of any one column forms an arc. In such an arrangement the arcs formed by the various columns of elements advantageously have a common center of curvature so that the beam may be projected from that center for storage on any desired storage element. Such an arrangement facilitates the focusing and sweeping of the electron beam.

Furthermore, writing, reading, and erasing on the three dimensional target described may be accomplished by utilizing a flat ribbon-like electron beam of width approximately equal to that of the target. While sweeping such a beam across the target, writing on a particular storage element is achieved by increasing the potential of that element only (rather than the potential of the entire column) and decreasing the potential of the corresponding control wires in the columns immediately preceding and immediately following. Reading and erasing are accomplished in a similar manner. However, if desired, with a ribbon beam all the elements in a column may be read or erased simultaneously during a single sweep of the beam.

It is to be understood further that in the present invention stored information need not be read in the order that it was stored. For example, one might store on columns 2, 4, and 6 in that order and then subsequently read column 6 before the other two columns. Additionally, if appropriate reading voltages be applied simultaneously to each of the three columns, one can read the three columns simultaneously, the output being a composite of the three columns of storage information. Also, it will be appreciated that a given column may be read more than once if desired before it is erased. Other techniques of operation will appear to one skilled in the art in the light of this disclosure.

What is claimed is:

1. In signal storage apparatus, a signal storage target comprising a three dimensional array of conductive elements, the elements of the array being spaced apart in rows and columns, and dielectric material coated on the elements of alternate rows; a source of electrons; means for projecting electrons from said source into a beam at a predetermined potential and for directing said beam along the interspace between adjacent element columns of the target; means for sweeping said electron beam across said target in successive scans along the successive interspaces between adjacent columns; means for maintaining selected ones of the coated elements of the target at a potential higher than the predetermined beam potential for attracting electrons from said beam for storage during a predetermined time interval; and means for subsequently maintaining the selected elements at a potential slightly less than the beam potential whereby the amount of beam current which passes said elements is a function of the voltage stored on the dielectric surface thereof.

2. The combination set forth in claim 1 further including means for modulating the beam during the storing time interval.

3. The combination set forth in claim 1 further including means for applying to the conductive elements which immediately precede the selected coated elements a signal voltage to be stored during the storing time interval.

4. In signal storage apparatus, a signal storage target comprising a three dimensional array of conductive elements, the elements of the array being spaced apart in rows and columns, and dielectric material coated on the elements of alternate rows; a source of electrons; means for projecting electrons from said source into a beam at a predetermined potential; means for directing said beam along the interspace between adjacent element columns of the target; means for sweeping said beam across the interspace between said adjacent element columns; means for maintaining selected ones of the coated elements at a potential higher than said beam potential and for maintaining corresponding conductive elements of the row immediately following the row of selected elements at a potential lower than said beam potential for attracting electrons from the beam for storage during a predetermined time interval; and means for subsequently maintaining said selected elements to a potential slightly less than the beam potential whereby the amount of beam current which passes said elements is affected by the voltage stored on the dielectric surface thereof.

5. In signal storage apparatus, a signal storage target comprising a three dimensional array of conductive wire-like elements, the elements of the array being spaced apart in rows and columns, and dielectric material coated on each of the elements of the array; a source of electrons; means for projecting electrons from said source into a beam at a predetermined potential; means for directing said beam along the interspace between adjacent element columns of the target; means for sweeping said beam across the interspace between said adjacent element columns; means for maintaining selected ones of the coated elements at a potential higher than said beam potential and for maintaining corresponding elements of the row immediately following the row of selected elements at a potential lower than said beam potential for attracting electrons from the beam for storage during a predetermined time interval; and means for subsequently maintaining said selected elements at a potential slightly less than the beam potential whereby the amount of beam current which passes said elements is affected by the voltage stored on the dielectric surface thereof.

6. Signal storage apparatus comprising a storage target which includes a three dimensional array of conductive wire-like elements arranged in rows and columns, and dielectric material coated on the elements of alternate rows, an electron gun for projecting a beam along the interspace between adjacent columns of elements of the storage target, deflection means for sweeping the beam along said interspace, and potential means for maintaining selected coated elements at a potential substantially higher than the beam potential for attracting thereto electrons from said beam.

7. Signal storage apparatus comprising a storage target which includes a three dimensional array of conductive wire-like elements arranged in rows and columns, and dielectric material coated on the elements of alternate rows, an electron gun for projecting a beam along the interspace between adjacent columns of elements of the storage target, deflections means for sweeping the beam along said interspace, and means for modulating said beam in accordance with variations in a signal voltage to be stored.

8. Signal storage apparatus comprising a storage target which includes a three dimensional array of conductive wire-like elements arranged in rows and columns, and dielectric material coated on the elements of alternate rows, an electron gun for projecting a beam along the interspace between adjacent columns of elements of the storage target, deflection means for sweeping the beam along said interspace, and means for modulating selected uncoated elements of the target in accordance with variations of a signal voltage to be stored.

9. Signal storage apparatus comprising a storage target which includes a three dimensional array of conductive wire-like elements arranged in rows and columns, and dielectric material coated on each of the elements of the array, an electron gun for projecting a beam along the interspace between adjacent columns of elements of the storage target to strike the dielectric coating material of one of said elements, and electron deflection means for sweeping said beam across said storage target in successive scans to penetrate the interspace between successive element columns.

10. Signal storage apparatus comprising a three dimensional array of conductive wire-like elements arranged in rows and columns, dielectric material coated on the elements of alternate rows, an electron gun for projecting the beam along the interspace between adjacent columns of elements of the array, and potential means for maintaining selected ones of the coated elements at a potential substantially higher than the beam potential for attracting thereto electrons from said beam.

11. Signal storage apparatus comprising a storage target which includes a three dimensional array of parallel extending conductive wire-like elements arranged in rows and columns, adjacent rows of conductive elements being staggered so that the centers of the elements forming each column fall along a nonlinear locus and dielectric material coated on the elements of alternate rows, an electron gun for projecting the beam along the interspace between adjacent columns of elements of the storage target, and potential means for maintaining selected coated elements at a potential substantially higher than the beam potential for attracting thereto electrons from said beam.

12. Signal storage apparatus comprising a storage target which includes a three dimensional array of conductive wire-like elements arranged in rows and columns, and dielectric material coated on the elements of alternate rows, an electron gun for projecting a beam along the interspace between adjacent columns of elements of the storage target for interception by the dielectric coating material on selected ones of said elements, and means for maintaining alternate rows of elements of the array at the same direct current potential and adjacent rows at a different direct current potential for collimating the electron flow along said interspace.

13. Signal storage apparatus comprising a storage target which includes a three dimensional array of conductive wire-like elements arranged in rows and columns, and dielectric material coated on each of the elements of the array; means for storing a voltage signal on selected elements of said target including an electron gun for projecting a beam along the interspace between adjacent columns of elements of the target, means for modulating said beam in accordance with the signal voltage to be stored, and potential means for maintaining the selected elements at a potential substantially higher than the beam potential for attracting thereto electrons from said modulated beam; and means for erasing the signal voltage stored on said selected elements including means for applying a high frequency voltage signal between each pair of adjacent rows of elements of the storage target.

14. The combination of elements set forth in claim 13 wherein the period of the signal voltage applied between each pair of adjacent rows of elements equals twice the time required for secondary electrons to travel between said adjacent rows.

15. In signal storage apparatus, a signal storage target comprising a three-dimensional array of parallel extending conductive wire-like elements arranged in rows and columns, dielectric material coated on the elements of alternate rows; an electron gun for projecting electrons in a beam along the interspace between adjacent columns of elements of the target; electron deflection means for sweeping said electron beam across said interspace; means for storing a signal voltage on selected elements of a predetermined row of said target including control electrode means for modulating the electron beam, and potential means for maintaining the selected elements at a potential substantially higher than the beam potential and for maintaining corresponding elements of the rows immediately preceding and immediately following said predetermined row at a potential less than the beam potential during a predetermined time interval while sweeping the modulated beam; maens for subsequently reading the signal voltage stored on said selected elements including potential means for maintaining the selected elements at a potential slightly less than the beam potential so that the amount of beam current which passes said selected elements is a function of the voltage stored on the dielectric surface of said elements, and means responsive to the amount of current flow received for receiving the current which passes the selected elements; and means for subsequently erasing the voltage stored on the selected elements including potential means for again maintaining the selected elements at a potential substantially higher than the beam potential.

References Cited in the file of this patent

UNITED STATES PATENTS

| | | |
|---|---|---|
| 2,645,734 | Rajchman | July 14, 1953 |
| 2,646,521 | Rajchman | July 21, 1953 |
| 2,658,670 | Morton et al. | Nov. 10, 1953 |
| 2,793,288 | Pulvari | May 21, 1957 |